US012155984B2

(12) United States Patent
Stark et al.

(10) Patent No.: US 12,155,984 B2
(45) Date of Patent: Nov. 26, 2024

(54) OPEN-EAR HEADPHONE

(71) Applicant: Bose Corporation, Framingham, MA (US)

(72) Inventors: Michael W. Stark, Acton, MA (US); Brandon L. Hicks, Ludlow, MA (US); Edgardo Alicea, Brockton, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 17/590,321

(22) Filed: Feb. 1, 2022

(65) Prior Publication Data

US 2023/0247339 A1 Aug. 3, 2023

(51) Int. Cl.
*H04R 25/00* (2006.01)
*H04R 1/10* (2006.01)

(52) U.S. Cl.
CPC .................................. *H04R 1/1008* (2013.01)

(58) Field of Classification Search
CPC ... H04R 1/105; H04R 1/1008; H04R 2460/09
See application file for complete search history.

(56) References Cited

U.S. PATENT DOCUMENTS

| | | | | |
|---|---|---|---|---|
| 10,063,958 | B2 * | 8/2018 | Jentz | H04R 1/105 |
| 11,140,469 | B1 | 10/2021 | Miller et al. | |
| 2012/0134524 | A1 * | 5/2012 | Peng | H04R 1/1075 381/380 |
| 2016/0134957 | A1 | 5/2016 | Jentz et al. | |
| 2018/0160208 | A1 | 6/2018 | Lee | |

OTHER PUBLICATIONS

International Search Report and Written Opinion, dated May 16, 2023 for related PCT/US2023/012125.

* cited by examiner

*Primary Examiner* — Amir H Etesam
(74) *Attorney, Agent, or Firm* — BOSE CORPORATION

(57) ABSTRACT

An open-ear headphone with an acoustic module configured to be located at least in part in a concha of an outer ear of a user. The acoustic module comprises a housing that contains an acoustic transducer. There is a first sound-emitting opening in the housing that is configured to emit sound produced by the acoustic transducer. The acoustic module defines a central longitudinal axis and the first sound-emitting opening is offset from the central axis.

20 Claims, 7 Drawing Sheets

OPEN-EAR HEADPHONE

BACKGROUND

This disclosure relates to a headphone that is carried on the ear.

Open-ear headphones typically emit sound close to but not in the ear canal.

SUMMARY

Aspects and examples are directed to an open-ear headphone with an acoustic module that is configured to be located in the concha of the outer ear of the user. In some examples the acoustic module is configured to be located in the cavum conchae. The acoustic module includes a housing that contains an acoustic transducer. There is a sound-emitting opening in the housing that is configured to emit sound produced by the acoustic transducer. The sound-emitting opening is offset from the central longitudinal axis of the acoustic module so that the opening is very close to but not in the ear canal opening. Locating the opening in this fashion leads to an increased acoustical output gain and thus a better user experience.

All examples and features mentioned below can be combined in any technically possible way.

In one aspect, an open-ear headphone includes an acoustic module configured to be located at least in part in a concha of an outer ear of a user. The acoustic module comprises a housing that contains an acoustic transducer. There is a first sound-emitting opening in the housing that is configured to emit sound produced by the acoustic transducer. The acoustic module defines a central longitudinal axis and the first sound-emitting opening is offset from the central axis.

Some examples include one of the above and/or below features, or any combination thereof. In an example the first sound-emitting opening is primarily or fully offset from the central longitudinal axis such that the first sound-emitting opening does not overlap the central longitudinal axis. In an example the central longitudinal axis bisects the acoustic module housing. In some examples the open-ear headphone also includes a body coupled to the acoustic module and comprising a first portion configured to pass over an outer side of at least one of (i.) an anti-helix and a helix and (ii.) a lobule of the outer ear, and a second portion configured to be located behind the outer ear. In an example the central longitudinal axis bisects the acoustic module housing and the first portion of the body. In an example the acoustic module housing defines a front face that is configured to be spaced from and proximate the user's ear canal opening and is curved relative to the central longitudinal axis, and the first sound-emitting opening is in the housing front face.

Some examples include one of the above and/or below features, or any combination thereof. In some examples the open-ear headphone further includes a second sound-emitting opening in the acoustic module housing. In an example the acoustic module housing defines first and second internal acoustic cavities that are on opposite sides of the acoustic transducer. In an example the first sound-emitting opening is a sound outlet for the first acoustic cavity and the second sound-emitting opening is a sound outlet for the second acoustic cavity. In an example acoustic energy from the first sound emitting opening combines with the acoustic energy from the second sound emitting opening to provide an acoustic dipole.

Some examples include one of the above and/or below features, or any combination thereof. In some examples the second sound-emitting opening is on the opposite side of the central longitudinal axis than is the first sound-emitting opening. In an example the acoustic module housing defines a front face, and a side that is rearward of the front face, and the first sound-emitting opening is in the front face of the acoustic module housing and the second sound-emitting opening is in the side of the acoustic module housing. In an example the acoustic module housing is configured to be located at least in part in a cavum conchae of the outer ear. In an example the first sound-emitting opening is configured to be closer to the ear canal opening than is the second sound-emitting opening.

Some examples include one of the above and/or below features, or any combination thereof. In some examples the open-ear headphone further includes a first microphone opening. In an example the first microphone opening is on the same side of the central longitudinal axis as is the first sound-emitting opening. In an example the open-ear headphone further includes a second microphone opening, and a bisecting line of the first and second microphone openings is configured to point toward an expected location of a mouth of a person wearing the open-ear headphone.

In another aspect, an open-ear headphone includes an acoustic module configured to be located at least in part in a concha of an outer ear of a user. The acoustic module comprises a housing that contains an acoustic transducer, and a first sound-emitting opening in the housing and that is configured to emit sound produced by the acoustic transducer. The acoustic module defines a central longitudinal axis that bisects the acoustic module housing. The first sound-emitting opening is either fully or almost fully offset from the central longitudinal axis such that the first sound-emitting opening either does not overlap the central longitudinal axis or overlaps the axis only slightly.

Some examples include one of the above and/or below features, or any combination thereof. In some examples the open-ear headphone further includes a second sound-emitting opening in the acoustic module housing, the acoustic module housing defines first and second internal acoustic cavities that are on opposite sides of the acoustic transducer, the first sound-emitting opening is a sound outlet for the first acoustic cavity and the second sound-emitting opening is a sound outlet for the second acoustic cavity, the second sound-emitting opening is on the opposite side of the central longitudinal axis than is the first sound-emitting opening, and acoustic energy from the first sound emitting opening combines with the acoustic energy from the second sound emitting opening to provide an acoustic dipole. In an example the acoustic module housing defines a front face, and a side that is rearward of the front face, and the first sound-emitting opening is in the front face of the acoustic module housing and the second sound-emitting opening is in the side of the acoustic module housing.

Some examples include one of the above and/or below features, or any combination thereof. In some examples the acoustic module housing is configured to be located at least in part in a cavum conchae of the outer ear, and the first sound-emitting opening is configured to be closer to the ear canal opening than is the second sound-emitting opening. In an example the open-ear headphone further includes a microphone opening that is on the same side of the central longitudinal axis as is the first sound-emitting opening.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the inventions. In the figures, identical or nearly identical components illustrated in various figures may be represented by a like reference character or numeral. For purposes of clarity, not every component may be labeled in every figure. In the figures.

DETAILED DESCRIPTION

Figure 1A:
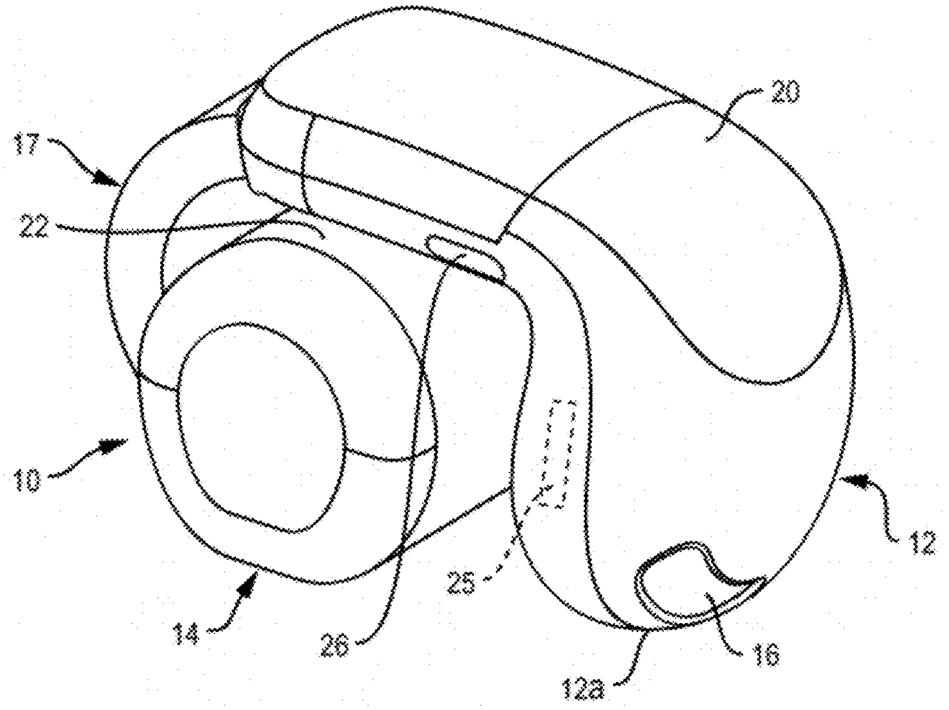
FIG. 1A is a bottom side perspective view of an open-ear headphone configured for the right ear.

Open-ear headphones that are carried on the ear should provide high-quality sound, be stable on the ear, be comfortable to wear for long periods of time, be unobtrusive, and look stylish. These goals can be difficult to achieve, as in some respects they have been considered mutually exclusive. For example, stability typically translates into clamping on the outer ear, which can be uncomfortable for long-term wear and may not look stylish. Also, for high-quality sound there must be sound delivery close to but not in the ear canal, meaning that headphone structure needs to overlie the ear and so may be highly visible to others. Also, for the best sound quality without occluding the ear canal, the sound should be delivered close to but not in the ear canal opening.

Examples of the open-ear headphones discussed herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the headphones herein referred to in the singular may also embrace embodiments including a plurality, and any references in plural to any example, component, element, act, or function herein may also embrace examples including only a singularity. Accordingly, references in the singular or plural form are not intended to limit the presently disclosed headphones, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In some examples herein the open-ear headphone includes an acoustic module configured to be located in the concha of the outer ear of the user, for example in the cavum conchae of the ear. The acoustic module comprises a housing that contains an acoustic transducer. A sound-emitting opening in the housing emits sound produced by the acoustic transducer. The acoustic module defines a central longitudinal axis and the sound-emitting opening is offset from the central axis. Generally, the opening is offset from the axis on the side of the housing that is closest to the ear canal opening.

In some examples the sound-emitting opening is fully offset from the central longitudinal axis such that it does not overlap the central longitudinal axis or it may be almost fully offset. In an example the central longitudinal axis bisects the acoustic module housing. In some examples the open-ear headphone also includes a body coupled to the acoustic module and comprising a first portion configured to pass over an outer side of at least one of (i.) the anti-helix and the helix and (ii.) the lobule of the outer ear, and a second portion configured to be located behind the outer ear. In an example the central longitudinal axis bisects the acoustic module housing and the first portion of the body. In an example the acoustic module housing defines a front face that is configured to be spaced from and proximate the user's ear canal opening, and is curved relative to the central longitudinal axis. In some examples the sound-emitting opening is in this housing front face.

In some examples the open-ear headphone also has a second sound-emitting opening in the acoustic module housing. In an example the acoustic module housing defines first and second internal acoustic cavities that are on opposite sides of the acoustic transducer. In an example the first sound-emitting opening is a sound outlet for the first acoustic cavity and the second sound-emitting opening is a sound outlet for the second acoustic cavity. In an example acoustic energy from the first sound emitting opening combines with the acoustic energy from the second sound emitting opening to provide an acoustic dipole; this reduces spilled sound that may be heard by others who are close to the headphone user.

In some examples the second sound-emitting opening is on the opposite side of the central longitudinal axis than is the first sound-emitting opening. In an example the acoustic module housing defines a front face, and a side that is rearward of the front face. In an example the first sound-emitting opening is in the front face of the acoustic module housing and the second sound-emitting opening is in the side of the acoustic module housing. In an example the first sound-emitting opening is configured to be closer to the ear canal opening than is the second sound-emitting opening.

In some examples the open-ear headphone further includes one or more microphone openings that each allow sound to enter the housing and be sensed by a microphone. In an example one microphone opening is on the same side of the central longitudinal axis as is the sound-emitting opening. In an example the bisecting line of first and second microphone openings is configured to point toward an expected location of a mouth of a person wearing the open-ear headphone. This arrangement facilitates the microphones being arrayed, to more selectively detect the user's voice in the presence of environmental noise.

The present open-ear headphone is able to meet all of these goals. The acoustic transducer or driver is in an acoustic module that is configured to be located in the cavum conchae of the outer ear, close to the ear canal. The acoustic module has a sound-emitting opening on the side configured to be closest to the ear canal, leading to higher quality sound and more acoustical output. The acoustic module is shaped to nestle in the lower concavity of the cavum conchae. A body section that carries the acoustic module is shaped to pass over the outer side of the anti-helix/helix/lobule of the ear, and ends in a distal portion that is located behind the outer ear. The center of gravity of the open-ear headphone is between the acoustic module and the distal portion, and is thus in or very close to the anti-helix, helix, or lobule; this leads to greater stability on the ear without the need to clamp on the ear. The open-ear headphone is thus comfortable for long-term wear.

Examples of the headphones described herein are not limited in application to the details of construction and the arrangement of components set forth in the following description or illustrated in the accompanying drawings. The headphones are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

Also, the phraseology and terminology used herein is for the purpose of description and should not be regarded as limiting. Any references to examples, components, elements, acts, or functions of the devices herein referred to in the singular may also embrace embodiments including a plurality, and any references in plural to any example, component, element, act, or function herein may also embrace examples including only a singularity. Accordingly, references in the singular or plural form are not intended to limit the presently disclosed devices, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

This disclosure features an open-ear headphone with an acoustic module configured to be located at least in part in a concha of an outer ear of a user and comprising an acoustic transducer and a first sound-emitting opening that is configured to emit sound produced by the acoustic transducer, and a body coupled to the acoustic module and comprising a first portion configured to pass over an outer side of the outer ear, and a second portion configured to be located behind the outer ear. The first sound-emitting opening is configured to be spaced from and proximate the user's ear canal opening, preferably in the cavum conchae and proximate the ear canal opening. In some examples the acoustic module is configured to be located in the cavum conchae. In a specific example the acoustic module has lower portion that is outwardly convex and is configured to sit in a lower concavity of the cavum conchae that is adjacent to the antitragus and lobule of the user's ear.

The open-ear headphone is configured such that when the acoustic module is placed into the cavum conchae of the ear the body passes over at least one of the antihelix, the helix, and the lobule of the ear. In an example the body is generally "L"-shaped and the acoustic module and body together (i.e., the entire open-ear headphone) is generally "C"-shaped. In some examples the acoustic module includes a second sound-emitting opening that is configured to be farther from the ear canal opening than is the first sound-emitting opening. The sound-emitting openings can be arranged to accomplish a dipole-like pattern that can result in sound cancelation that reduces spillage of the sound that can be heard by others. In one example the acoustic transducer produces sound pressure in front and back acoustic cavities of the acoustic module, and the first sound-emitting opening is fluidly coupled to the front acoustic cavity and the second sound-emitting opening is fluidly coupled to the back acoustic cavity.

In some examples a second portion of the body includes a battery housing that is configured to house a battery power source for the open-ear headphone. There can be a printed circuit board in the first portion of the body and that is electrically coupled to the battery, and a flexible circuit element that electrically couples the printed circuit board to the acoustic transducer. In some examples the open-ear headphone also includes a pair of microphones located just below openings that allow outside sound to reach the microphones. These microphones can be located in opposed sides of the first portion of the body such that one microphone is configured to be farther from the user's mouth than is the second microphone. An axis passing through the microphones is generally aligned with the user's mouth. The microphones can be arrayed, such as by beam-steering, to improve the pickup of the user's voice in the presence of noise or other external sounds.

FIGS. 1A-1C, FIGS. 3A-3C, and FIG. 4 illustrate an exemplary open-ear headphone 10. Open-ear headphone 10 includes acoustic module 12 that is sized, shaped, and located relative to the open-ear headphone body 13 such that the acoustic module 12 is configured to be located in the concha of the outer ear of the user. Generally, the outer ear (also known as the auricle or pinna) of a human includes a concha that is immediately adjacent to the entrance to the ear canal, which is underneath (or, behind) the tragus. The concha is divided by the helix crus into a lower portion termed the cavum conchae and an upper portion termed the cymba conchae. The cavum conchae is a generally bowl-shaped feature that is directly adjacent to the ear canal. The cavum conchae typically includes a depression bordered by the anti-tragus, which is the lower part of the anti-helix and/or bordered by the lobule. The lobule (i.e., the earlobe), which is at the lower end of the helix, is typically just below the anti-tragus.

Open-ear headphone 10 body 13 is coupled to acoustic module 12 and includes a first portion 20 that is configured to pass over the outer side of the ear (e.g., at least one of the anti-helix and helix and lobule of the outer ear), and a second portion 14 that is configured to be located behind the outer ear. Body 13 is generally "L"-shaped from the side (as shown for example in FIGS. 3A and 4) with portion 20 running at about a right angle to acoustic module 12, connecting portion 17 running at about a right angle to portion 20 and leading to distal portion 14. In an example portion 14 can be generally cylindrical such that it is configured to hold a generally cylindrical battery power source (e.g., a rechargeable battery). Overall, open-ear headphone 10 is generally "C"-shaped, as shown in FIGS. 1A, 1B, 3A, and 4. In an example, acoustic module 12 and body 13 are parts of a unitary molded plastic housing that is constructed and arranged to contain at least the transducer and any necessary electronics for operation of the headphone. Space 22 between portion 14 and portion 20 accommodates the outer ear, as further explained elsewhere herein.

Acoustic module 12 includes a first sound-emitting opening or port 16 that is located in the part of the housing that is configured to be located closest to the user's ear canal opening. Since the front 12*a* of acoustic module 12 generally points toward the back of the cavum conchae and does not point directly at the ear canal opening, front 12*a* is generally not the closest part of acoustic module 12 to the ear canal opening. Also, the front face of the housing is curved relative to axis 11, as shown in FIG. 1C. Locating opening 16 off center of the front 12*a* (which in some examples is mostly or fully inferior of housing central longitudinal axis 11) places opening 16 at the closest possible location to the ear canal opening. In an example opening 16 is about 2 mm closer to the ear canal opening than would be the case if opening 16 was centered on axis 11. This leads to an acoustical output gain of up to about 2 dB. In some examples opening 16 is fully offset from axis 11; in other words opening 16 does not intersect axis 11. In other examples (as shown in FIG. 1C), opening 16 slightly overlaps axis 11, but the majority of opening 16 is to one side of axis 11. In some examples the headphone for the right and left ears are essentially the same except opening 16 is fully or mostly inferior of bisecting axis 11 and so is on opposite sides of axis 11 for opposite ears.

In some examples headphone 10 includes a second sound-emitting opening 24 that is configured to be farther from the ear canal opening than is the first sound-emitting opening 16. The two sound-emitting openings can be arranged to accomplish a dipole-like pattern that can result in sound cancelation that reduces spillage of the sound that can be heard by others. In one example the acoustic transducer produces sound pressure in front and back acoustic cavity portions of the acoustic cavity of the acoustic module, and the first sound-emitting opening 16 is fluidly coupled to the front acoustic cavity and the second sound-emitting opening 24 is fluidly coupled to the back acoustic cavity. Sound-emitting openings can be covered by resistive or environmentally-protective elements such as cloths or weaves. In some examples, the volumes of the front and back acoustic cavities together with the areas of openings 16 and 24 are selected to accomplish front and back cavity resonances that are similar. This helps to maximize far field cancellation and thus minimize sound spillage. In some examples second opening or port 24 is on the opposite side of axis 11 than is opening 16. This places the front and back openings as far apart as is practical in the headphone design, which assists with the dipole-like performance and maximizes the acoustic output at the nearfield of the front opening, over a range of fit locations of the device. Also, back vent 24 can be placed farther from a microphone, which may reduce acoustic echo picked up from loudspeaker to the microphone.

In some examples open-ear headphone 10 carries one or more external microphones. External microphones can be used to sense the user's voice and/or sense environmental sounds and/or as feed-forward microphones of an active noise cancelation system. In this example, external microphones are located just below microphone openings 18 and 26, which are located in opposed sides of body portion 20 such that they lie generally along an axis that intersects or passes close to the expected location of the user's mouth. This way the microphones can be beam-formed if desired. Also, locating a microphone between the front and back ports (as is generally the case with microphone 26) places the microphone generally in a null region of the cardioid radiation pattern of the dipole, which reduces the amount of sound from either of the front and back openings that is sensed.

Figure 2:
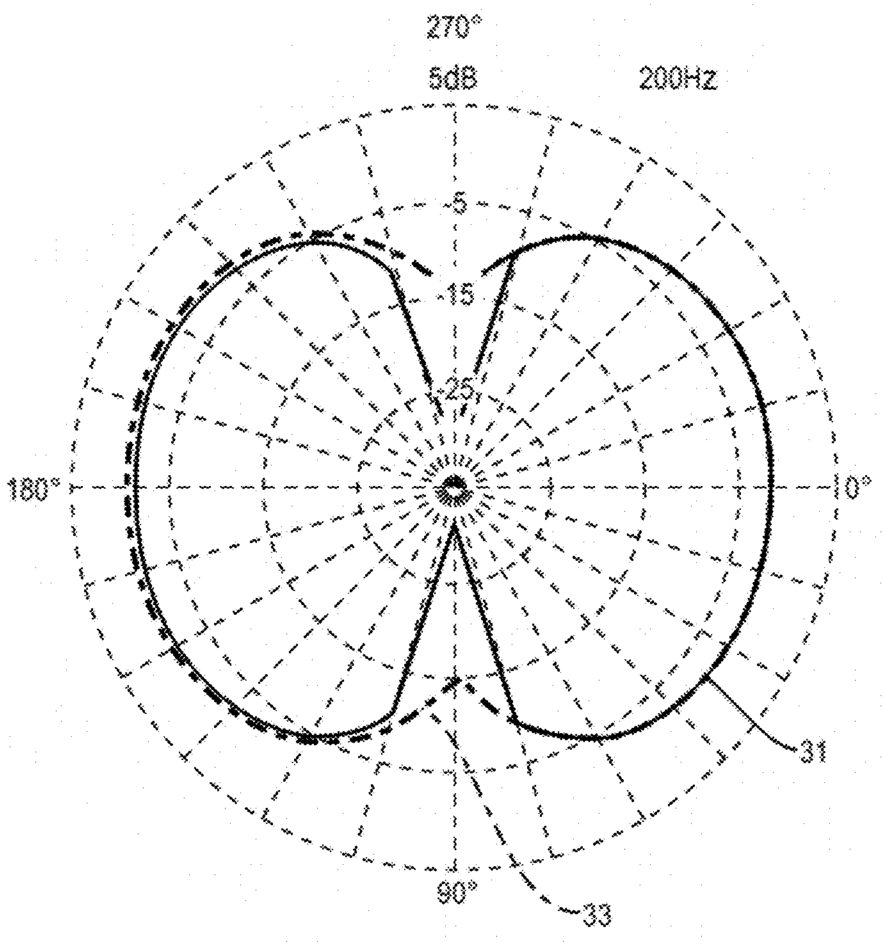
FIG. 2 is an exemplary polar plot of the output of a dipole transducer.

At low frequencies acoustic drivers frequently exhibit a dipole radiation pattern wherein sound is radiated in opposite directions (at 0 and 180 degrees), and 180 degrees out of phase, and along an orthogonal axis (at 90 and 270 degrees) sound pressure is substantially lower, defining nulls. FIG. 2 is a polar plot of the output of a single driver in a housing with both front and rear sound-emitting openings, with and without an acoustic resistance mesh material over the rear port opening. The plots of FIG. 2 were taken at 200 Hz and show typical dipole radiation without mesh (curve 31) and with mesh (curve 33). This illustrates an example of a single driver implementation of the subject open-ear headphone, wherein at low frequencies sound is cancelled in the far field. At high frequencies most of the sound energy is directed into the ear of a wearer rather than in other directions.

Figure 1B:
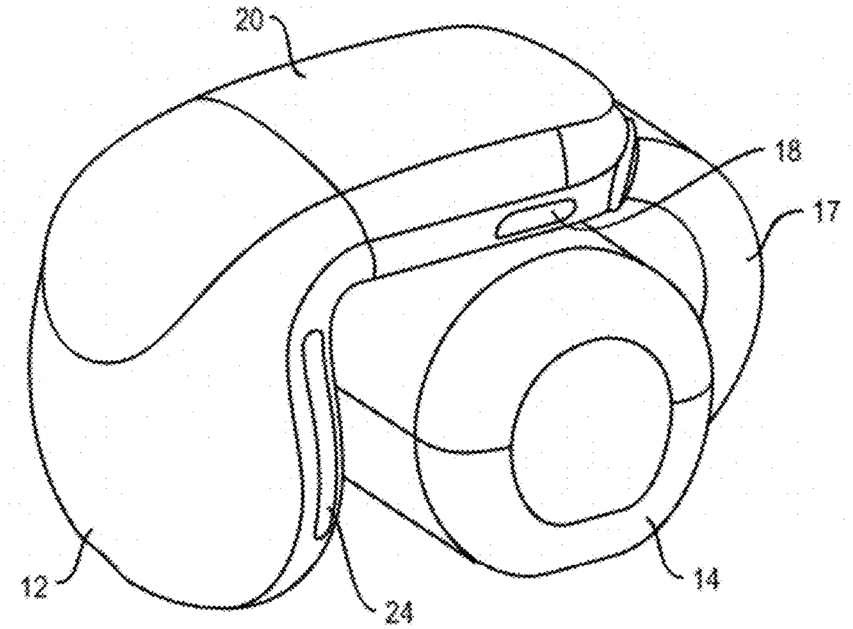
FIG. 1B is a top side perspective view of the open-ear headphone.
Figure 1C:
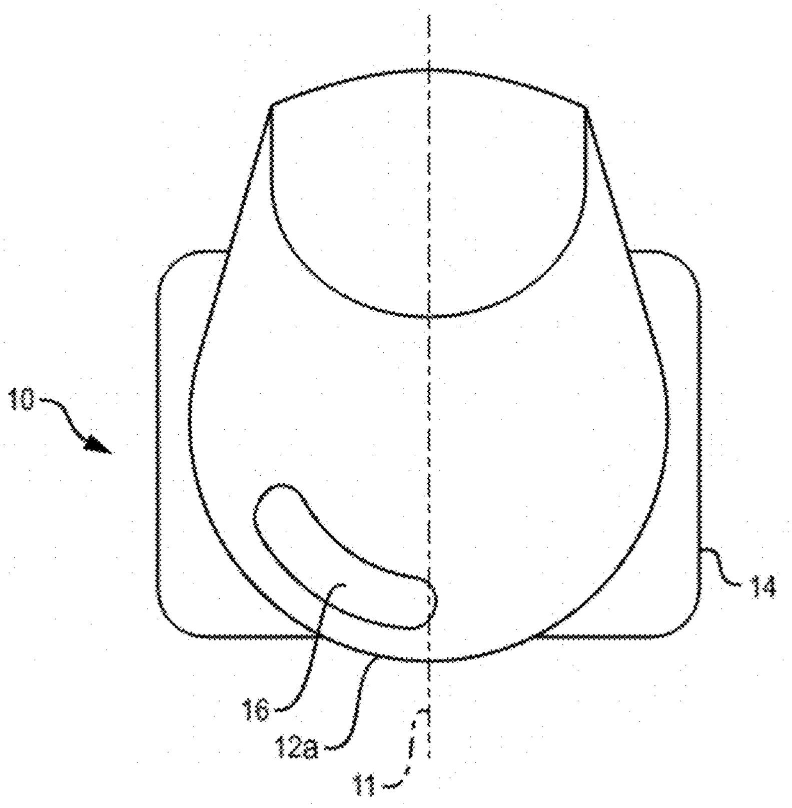
FIG. 1C is a front view of the open-ear headphone.
Figure 3A:
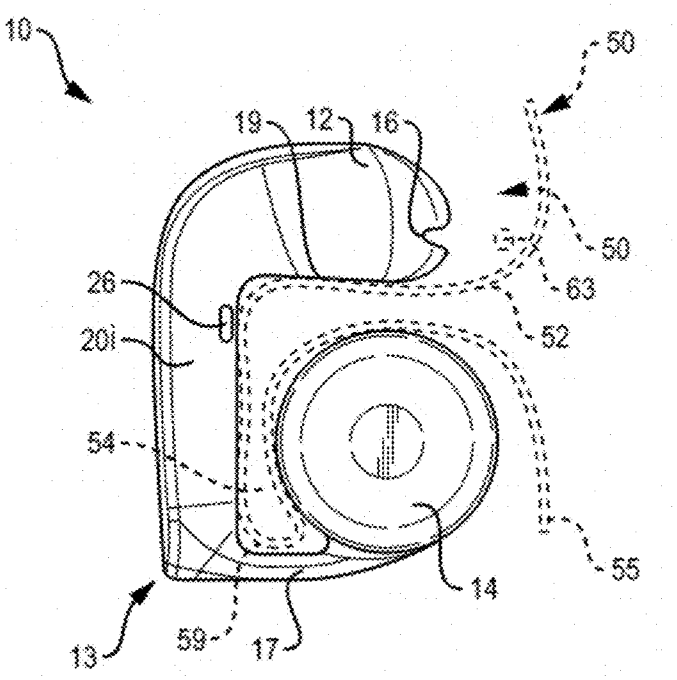
FIGS. 3A-3C illustrate the open-ear headphone of FIGS. 1A-1C in place on an ear.
Figure 3B:
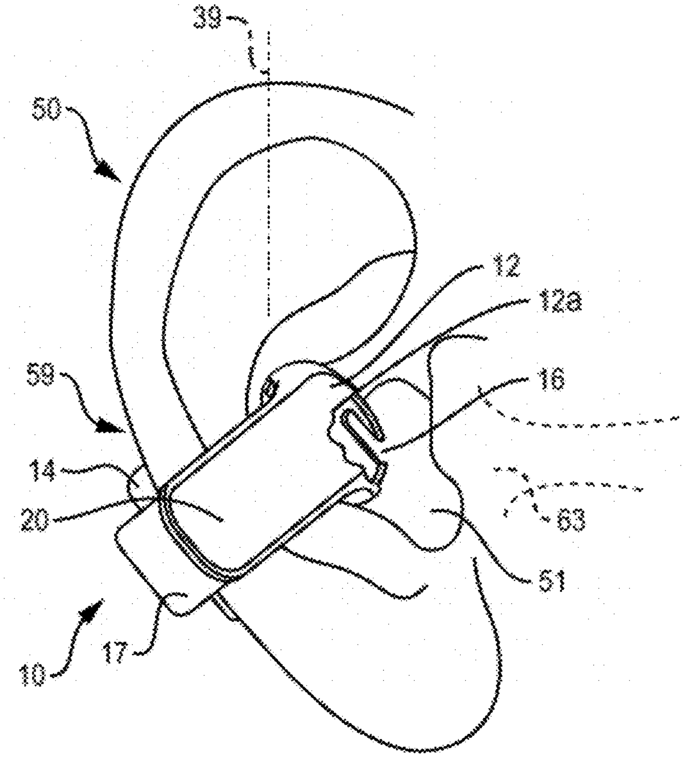
Figure 3C:
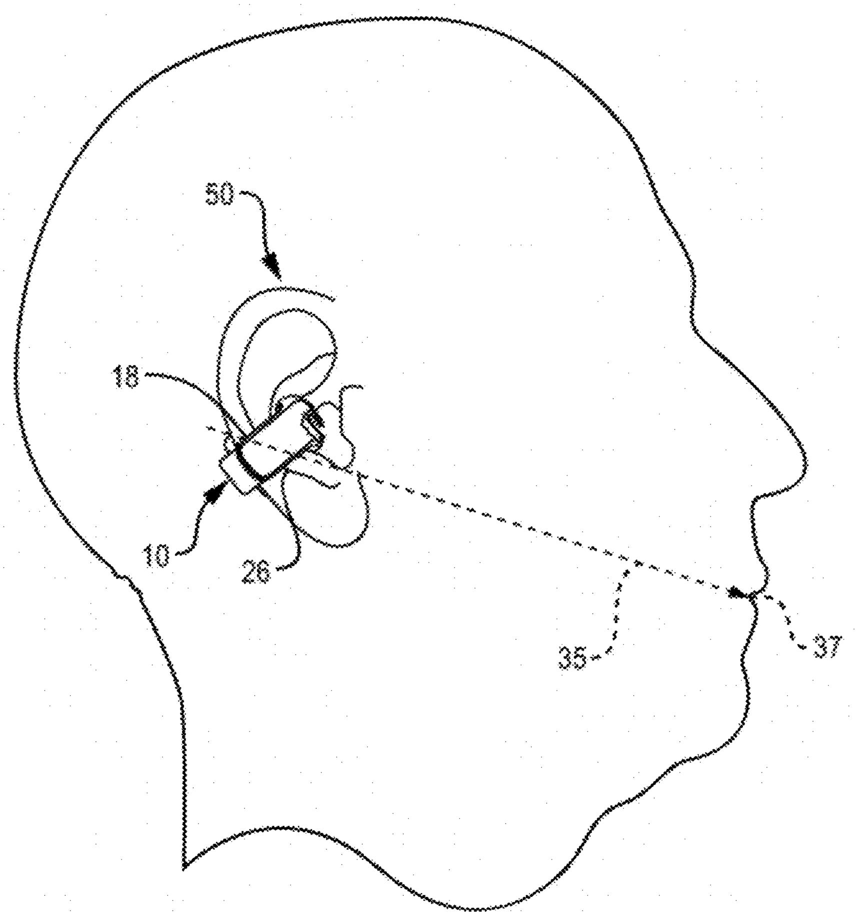

FIGS. 3A-3C illustrate how the open-ear headphone of FIGS. 1A-1C interfaces with the outer ear. As shown in FIGS. 3A and 3B, acoustic module 12 sits in the cavum conchae 51 of outer ear 50 (the right ear illustrated). First sound-emitting opening 16 emits sound produced by an acoustic transducer in acoustic module 12. Sound-emitting opening 16 is spaced from but close to the user's ear canal opening 63. In this example acoustic module 12 has lower portion 19 that is outwardly convex and is configured to sit in lower concavity 52 of cavum conchae 51. The weight of the open-ear headphone thus hangs from and is suspended from the cavum conchae; this holds the open-ear headphone on the ear without the need for it to clamp to the ear. Light clamping of the open-ear headphone to the ear can be facilitated using built-in compliance. In some examples, at least portion 17 is made at least partially of an elastomer or includes a hinge element so that it can flex relative to portion 20, thus altering the location of portion 14 and altering the thickness of the gap 22, FIG. 1A between portions 20 and 14 that encompass ear portion 54. A suitable compliant elastomer may have a hardness of 80 durometer shore A. Details of constructions of and flexing of portion or arm 17 are further disclosed in two U.S. Patent applications that are identified as follows: U.S. patent application Ser. No. 17/590,509 filed Feb. 1, 2022 and U.S. patent application Ser. No. 17/587,761 filed Jan. 28, 2022, the entire disclosures of which are incorporated by reference herein for all purposes.

The open-ear headphone is configured such that when the acoustic module is placed into the cavum conchae of the ear the body passes over at least one of the antihelix, the helix, and the lobule of the ear, any one or more of these portions of ear 50 designated generally as 54 in FIG. 3A. The user is able to pivot the body to a comfortable or otherwise desirable position of the body on the outer ear. Second body portion 14 is behind the outer ear. In other words, it is located between outer ear 50 and the adjacent portion of head 55, as shown in FIG. 3A. Portion 17 connects portions 20 and 14 and is configured to pass over edge 59 of outer ear 50. As shown in FIG. 3B, portion 20 generally sits at an angle to the superior-inferior (vertical) axis 39 such that portion 17 is inferior to acoustic module 12. Since opening 16 is on the inferior side of front 12*a* of acoustic module 12 as shown in FIG. 3B, opening 16 is effectively at the closest part of acoustic module 12 to ear canal opening 63. Additional aspects of a manner in which open-ear headphone 10 interacts with outer ear 50 are more fully explained in the U.S. Patent that is incorporated herein by reference.

FIG. 3C illustrates that microphone openings 18 and 26 are generally aligned along axis 35 that intersects mouth 37. As explained in more detail elsewhere herein, this alignment helps to allow the microphones to be beam-formed, which is able to increase the signal-to-noise ratio of the voice.

Figure 4:
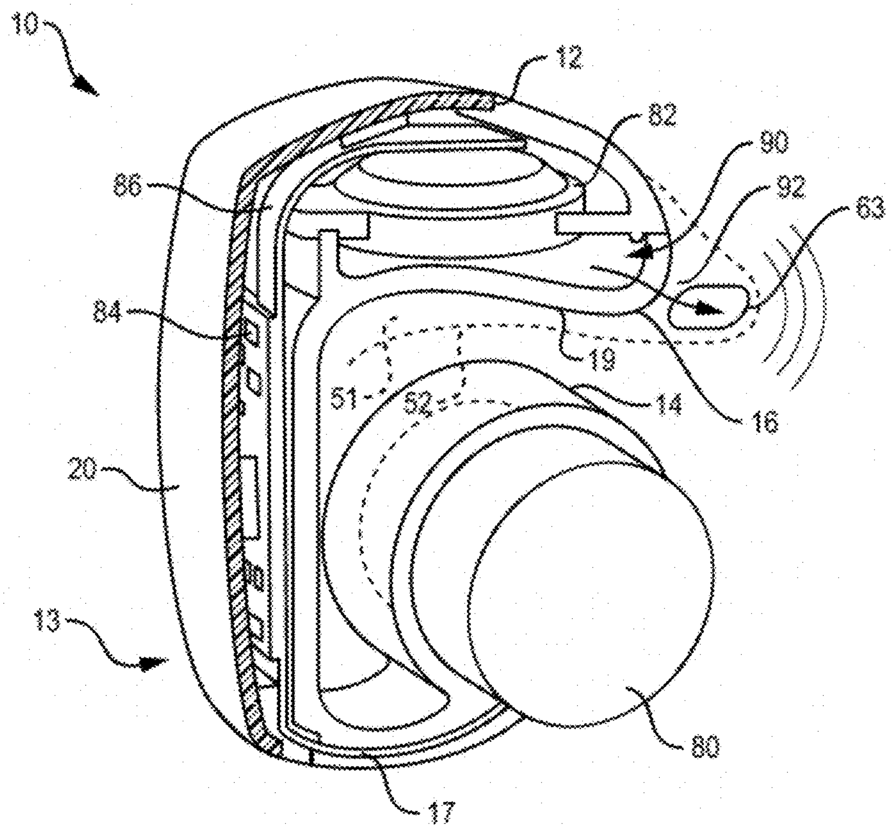
FIG. 4 is a cross-sectional view of the open-ear headphone of FIGS. 1A-1C and FIGS. 3A-3C.

FIG. 4 is a schematic partial cross-sectional view of open-ear headphone 10 illustrating battery 80 carried inside of body portion 14. Acoustic module 12 carries acoustic transducer 82 that generates sound pressure in acoustic cavity 90. Sound-emitting opening 16 is in the end of acoustic module 12 that is closest to ear canal opening 63. Sound is emitted through opening 16, as indicated by arrow 92. In some examples a set of headphones includes one left headphone and one right headphone, with configurations (such as the location of the front port opening) that are specific for the designated ear. Printed circuit board (PCB) 84 is located in body portion 20 and is electrically coupled to battery 80. Flex circuit element 86 leads from PCB 84 to transducer 82, to carry at least power and audio signals to the transducer. User interface elements can be built into the body portion if desired.

Additional details of an open-ear headphone, including but not limited to its construction, operation, and details of its acoustic performance, are disclosed in U.S. Pat. No. 11,140,469, the entire disclosure of which is incorporated herein by reference and for all purposes. Aspects of the present open-ear headphone that are disclosed in this patent are not further described herein.

Figure 5:
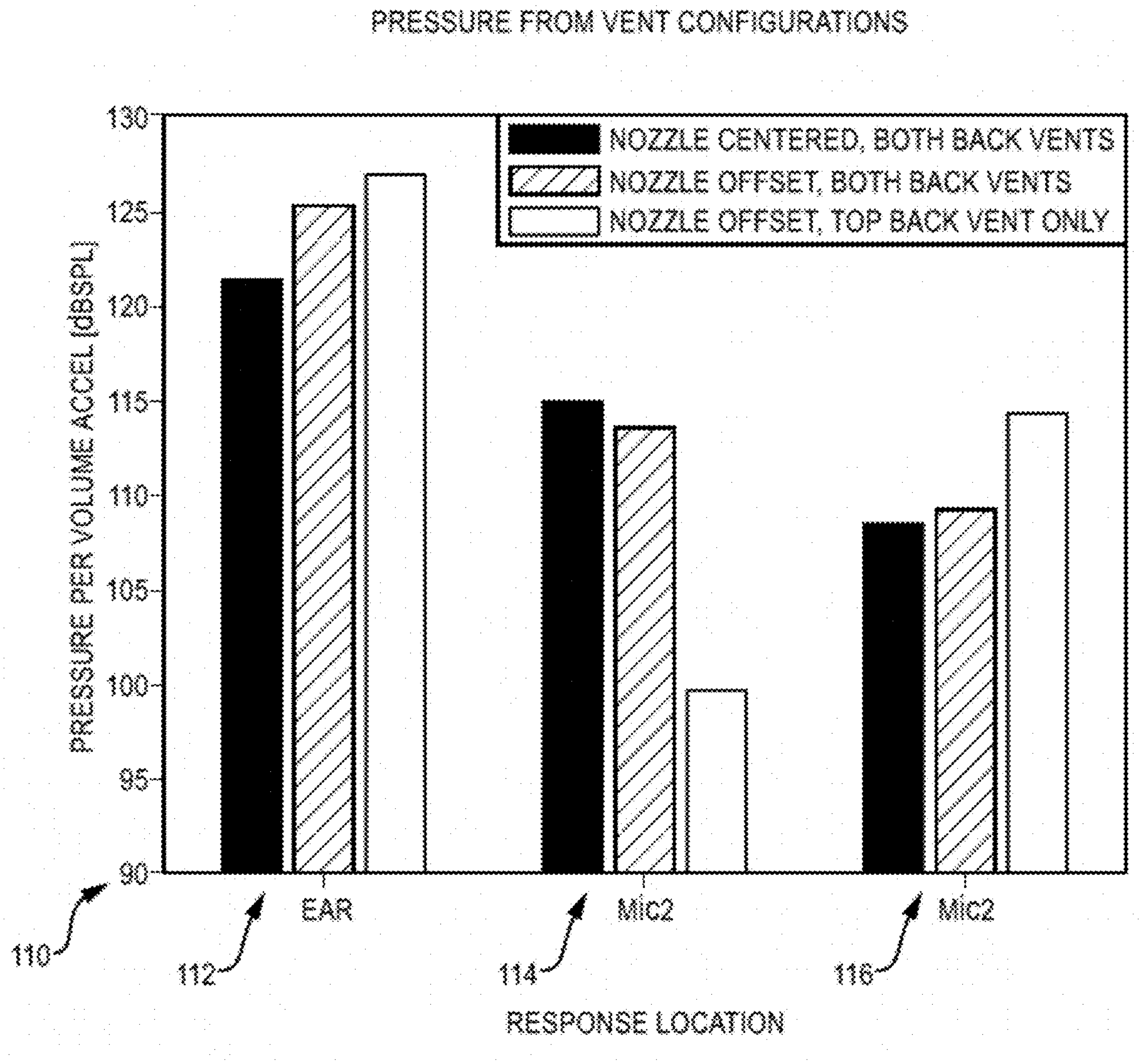
FIG. 5 is a plot of acoustic pressure at the ear and the two microphones for several configurations of an exemplary open-ear headphone.

FIG. 5 illustrates exemplary sound pressure data 110 (dB sound pressure level (SPL)) from three different configurations of an open-ear headphone, at 200 Hz. A first configuration (nozzle centered, both back vents) is a configuration such as disclosed in the U.S. Patent that is incorporated by reference herein in which the front opening or nozzle is centered on axis 11, FIG. 1C, and there are two rear or back vents. A second configuration (nozzle offset, both back vents) is the same as the first configuration except that the nozzle is offset from axis 11, as shown in FIG. 1C. A third configuration (nozzle offset, top back vent only) has the same nozzle location as the second configuration but has only one back vent, which is the "top" vent meaning it is on the superior side of the acoustic module when the open-ear headphone is carried on the ear (e.g., back vent 24, FIG. 1B).

The data set at the ear (data set 112) establishes that moving the nozzle 16 to an offset location increases sound pressure at the ear. Also, with both back vents there is a top or superior vent and a bottom or inferior vent. Top vent 24, FIG. 1B, has a lower pressure than would a bottom vent at location 25, FIG. 1A. Since the top vent has a lower pressure, it will cancel less sound (from the nozzle) at the ear, thus leading to better performance with a single (top) back vent as compared to two back vents.

The data set at the location of "Mic 1" (which is at location 26, FIG. 1A) establishes that removing second back vent 25 and thus having a single (top) back vent leads to improved performance (i.e., less sound sensed by Mic 1). The improvement is likely due to moving the sound source that is closest to Mic 1 (which would be the back vent at location 25) farther from the mic. The closest sound source is now nozzle 16. There is thus less acoustical pickup from the speaker to this microphone, allowing better performance during double-talk conditions.

The data set at the location of "Mic 2" (which is at location 18, FIG. 1B) establishes that the single back vent 24 increases the sound sensed by Mic 2. The reason is likely due to the elongation of vent 24 as compared to the smaller back vent at this location in the version with two back vents. The vent is elongated as a means to maintain about the same total back vent volume as the two back vent version, but with only a single back vent. The elongation of vent 24 places part of vent 24 closer to Mic 2.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An open-ear headphone, comprising:

an acoustic module configured to be located at least in part in a concha of an outer ear of a user, wherein the acoustic module comprises a housing that contains an acoustic transducer, a first sound-emitting opening in the housing and that is configured to emit sound produced by the acoustic transducer, and a second sound-emitting opening in the acoustic module housing; and wherein the acoustic module defines a central longitudinal axis and the first sound-emitting opening is offset from the central axis.

2. The open-ear headphone of claim 1, wherein the first sound-emitting opening is almost fully offset from the central longitudinal axis such that the first sound-emitting opening just barely overlaps the central longitudinal axis.

3. The open-ear headphone of claim 1 wherein the central longitudinal axis bisects the acoustic module housing.

4. The open-ear headphone of claim 1 further comprising a body coupled to the acoustic module and comprising a first portion configured to pass over an outer side of at least one of an anti-helix and a helix and a lobule of the outer ear, and a second portion configured to be located behind the outer ear.

5. The open-ear headphone of claim 4 wherein the central longitudinal axis bisects the acoustic module housing and the first portion of the body.

6. The open-ear headphone of claim 1 wherein the acoustic module housing defines a front face that is configured to be spaced from and proximate the user's ear canal opening and is curved relative to the central longitudinal axis, and wherein the first sound-emitting opening is in the housing front face.

7. The open-ear headphone of claim 1 wherein the acoustic module housing defines first and second internal acoustic cavities that are on opposite sides of the acoustic transducer.

8. The open-ear headphone of claim 7 wherein the first sound-emitting opening is a sound outlet for the first acoustic cavity and the second sound-emitting opening is a sound outlet for the second acoustic cavity.

9. The open-ear headphone of claim 8 wherein acoustic energy from the first sound emitting opening combines with the acoustic energy from the second sound emitting opening to provide an acoustic dipole.

10. The open-ear headphone of claim 8 wherein the second sound-emitting opening is on the opposite side of the central longitudinal axis than is the first sound-emitting opening.

11. The open-ear headphone of claim 10 wherein the acoustic module housing defines a front face, and a side that is rearward of the front face, and wherein the first sound-emitting opening is in the front face of the acoustic module housing and the second sound-emitting opening is in the side of the acoustic module housing.

12. The open-ear headphone of claim 11 wherein the acoustic module housing is configured to be located at least in part in a cavum conchae of the outer ear.

13. The open-ear headphone of claim 12 wherein the first sound-emitting opening is configured to be substantially closer to the ear canal opening than is the second sound-emitting opening.

14. The open-ear headphone of claim 10 further comprising a first microphone opening.

15. The open-ear headphone of claim 14 wherein the first microphone opening is on the same side of the central longitudinal axis as is the first sound-emitting opening.

16. The open-ear headphone of claim 14 further comprising a second microphone opening, wherein a bisecting line of the first and second microphone openings is configured to point toward an expected location of a mouth of a person wearing the open-ear headphone.

17. An open-ear headphone, comprising:

an acoustic module configured to be located at least in part in a concha of an outer ear of a user, wherein the acoustic module comprises a housing that contains an acoustic transducer, a first sound-emitting opening in the housing and that is configured to emit sound produced by the acoustic transducer, and a second sound-emitting opening in the acoustic module housing, wherein the acoustic module housing defines first and second internal acoustic cavities that are on opposite sides of the acoustic transducer, wherein the first sound-emitting opening is a sound outlet for the first acoustic cavity and the second sound-emitting opening is a sound outlet for the second acoustic cavity, and wherein acoustic energy from the first sound emitting opening combines with the acoustic energy from the second sound emitting opening to provide an acoustic dipole;

wherein the acoustic module defines a central longitudinal axis that bisects the acoustic module housing, wherein the second sound-emitting opening is on the opposite side of the central longitudinal axis than is the first sound-emitting opening; and wherein the first sound-emitting opening is almost fully offset from the central longitudinal axis such that the first sound-emitting opening just barely overlaps the central longitudinal axis.

18. The open-ear headphone of claim 17 wherein the acoustic module housing defines a front face, and a side that is rearward of the front face, and wherein the first sound-emitting opening is in the front face of the acoustic module housing and the second sound-emitting opening is in the side of the acoustic module housing.

19. The open-ear headphone of claim 18 wherein the acoustic module housing is configured to be located at least in part in a cavum conchae of the outer ear, and wherein the first sound-emitting opening is configured to be closer to the ear canal opening than is the second sound-emitting opening.

20. The open-ear headphone of claim 19 further comprising a microphone opening that is on the same side of the central longitudinal axis as is the first sound-emitting opening.

* * * * *